US010019571B2

(12) United States Patent
Teper et al.

(10) Patent No.: US 10,019,571 B2
(45) Date of Patent: Jul. 10, 2018

(54) PROTECTION FROM SIDE-CHANNEL ATTACKS BY VARYING CLOCK DELAYS

(71) Applicant: Winbond Electronics Corporation, Zhubei (TW)

(72) Inventors: Valery Teper, Petach-Tikva (IL); Uri Kaluzhny, Beit Shemesh (IL)

(73) Assignee: WINBOND ELECTRONICS CORPORATION, Zhubei (TW)

( * ) Notice: Subject to any disclaimer, the term of this patent is extended or adjusted under 35 U.S.C. 154(b) by 169 days.

(21) Appl. No.: 15/068,587

(22) Filed: Mar. 13, 2016

(65) Prior Publication Data
US 2017/0262630 A1   Sep. 14, 2017

(51) Int. Cl.
*G06F 12/14*   (2006.01)
*G06F 12/16*   (2006.01)
*G06F 21/55*   (2013.01)
*G06F 1/08*    (2006.01)
*G09C 1/00*    (2006.01)
*H04L 9/00*    (2006.01)

(52) U.S. Cl.
CPC .............. *G06F 21/55* (2013.01); *G06F 1/08* (2013.01); *G09C 1/00* (2013.01); *H04L 9/003* (2013.01); *H04L 2209/08* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 4,521,853 A | 6/1985 | Guttag | |
| 5,404,402 A * | 4/1995 | Sprunk | H01L 23/57 |
| | | | 380/28 |
| 5,671,283 A | 9/1997 | Michener et al. | |
| 5,703,952 A | 12/1997 | Taylor | |
| 6,272,637 B1 | 8/2001 | Little et al. | |
| 6,915,175 B2 | 7/2005 | Ahn | |
| 6,976,136 B2 | 12/2005 | Falik et al. | |
| 7,082,539 B1 | 7/2006 | Kitahara et al. | |
| 7,194,626 B2 | 3/2007 | Craft | |
| 7,242,772 B1 | 7/2007 | Tehranchi | |

(Continued)

FOREIGN PATENT DOCUMENTS

AU   2001027074 B2   7/2001
EP      1063811 A1   12/2000
(Continued)

OTHER PUBLICATIONS

TCG PC Specific Implementation Specification, Version 1.1, 72 pages, Aug. 18, 2003.
(Continued)

*Primary Examiner* — Fatoumata Traore
(74) *Attorney, Agent, or Firm* — D. Kligler IP Services Ltd.

(57) ABSTRACT

A system, comprising a logic circuit and delay circuitry, is described. The logic circuit is configured to perform a plurality of instances of a particular computation that is based on a plurality of inputs. The delay circuitry is configured to vary a power-consumption profile of the logic circuit over the plurality of instances, by applying, to the inputs, respective delays that vary over the instances, at least some of the delays varying independently from each other. Other embodiments are also described.

16 Claims, 3 Drawing Sheets

(56) References Cited

U.S. PATENT DOCUMENTS

| | | | |
|---|---|---|---|
| 7,248,696 B2 | 7/2007 | Craft et al. | |
| 7,269,747 B2 | 9/2007 | Catherman et al. | |
| 7,739,565 B1 | 6/2010 | Lesea | |
| 7,826,271 B2 | 11/2010 | Cernea | |
| 7,836,269 B2 | 11/2010 | Obereiner et al. | |
| 7,881,094 B2 | 2/2011 | Chen | |
| 7,882,365 B2 | 2/2011 | Natarajan et al. | |
| 7,889,592 B2 | 2/2011 | Kim | |
| 8,041,032 B2 | 10/2011 | Katoozi et al. | |
| 8,108,941 B2 | 1/2012 | Kanai | |
| 8,140,824 B2 | 3/2012 | Craft | |
| 8,225,182 B2 | 7/2012 | Kagan et al. | |
| 8,266,194 B2 | 9/2012 | Kaluzhny | |
| 8,312,294 B2 | 11/2012 | Sato et al. | |
| 8,422,671 B2 | 4/2013 | Yoon et al. | |
| 8,427,194 B2 | 4/2013 | Deas et al. | |
| 8,429,513 B2 | 4/2013 | Smith et al. | |
| 8,549,246 B2 | 10/2013 | Pekny et al. | |
| 8,576,622 B2 | 11/2013 | Yoon et al. | |
| 8,578,179 B2 | 11/2013 | Acciemez et al. | |
| 8,670,557 B2 | 3/2014 | Trichina et al. | |
| 8,745,408 B2 | 6/2014 | Mangard | |
| 8,756,439 B1 | 6/2014 | Jannson et al. | |
| 8,781,111 B2 | 7/2014 | Qi et al. | |
| 8,832,455 B1 | 9/2014 | Drewry et al. | |
| 9,318,221 B2 | 4/2016 | Tasher et al. | |
| 9,343,162 B2 | 5/2016 | Tasher et al. | |
| 9,455,962 B2 | 9/2016 | Tasher et al. | |
| 2001/0003540 A1 | 6/2001 | Pomet et al. | |
| 2002/0164022 A1 | 11/2002 | Strasser et al. | |
| 2003/0005453 A1 | 1/2003 | Rodriguez et al. | |
| 2003/0084285 A1 | 5/2003 | Cromer et al. | |
| 2003/0084346 A1 | 5/2003 | Kozuch et al. | |
| 2003/0097579 A1 | 5/2003 | England et al. | |
| 2003/0200026 A1 | 10/2003 | Pearson | |
| 2004/0260932 A1 | 12/2004 | Blangy et al. | |
| 2005/0024922 A1 | 2/2005 | Li et al. | |
| 2005/0039035 A1 | 2/2005 | Clowes | |
| 2005/0058285 A1 | 3/2005 | Stein et al. | |
| 2005/0114687 A1 | 5/2005 | Zimmer et al. | |
| 2005/0123135 A1 | 6/2005 | Hunt et al. | |
| 2006/0026418 A1 | 2/2006 | Bade et al. | |
| 2006/0026693 A1 | 2/2006 | Bade et al. | |
| 2006/0059553 A1 | 3/2006 | Morais et al. | |
| 2006/0107054 A1 | 5/2006 | Young | |
| 2006/0253708 A1 | 11/2006 | Bardouillet et al. | |
| 2007/0101424 A1 | 5/2007 | Ravi et al. | |
| 2007/0133437 A1 | 6/2007 | Wengrovitz et al. | |
| 2007/0192592 A1 | 8/2007 | Goettfert et al. | |
| 2008/0155273 A1 | 6/2008 | Conti | |
| 2009/0196420 A1 | 8/2009 | Chester et al. | |
| 2009/0217377 A1 | 8/2009 | Arbaugh et al. | |
| 2009/0327633 A1 | 12/2009 | Fusella et al. | |
| 2010/0070779 A1 | 3/2010 | Martinez et al. | |
| 2010/0095133 A1 | 4/2010 | Peter et al. | |
| 2010/0098247 A1 | 4/2010 | Suumaki | |
| 2010/0106920 A1 | 4/2010 | Anckaert et al. | |
| 2010/0146190 A1 | 6/2010 | Chang | |
| 2010/0158242 A1 | 6/2010 | Asher | |
| 2010/0169654 A1 | 7/2010 | Kiel et al. | |
| 2011/0185435 A1 | 7/2011 | Chang | |
| 2011/0283115 A1 | 11/2011 | Junod | |
| 2011/0285420 A1* | 11/2011 | Deas | H04L 9/003 326/8 |
| 2011/0285421 A1 | 11/2011 | Deas et al. | |
| 2012/0079221 A1* | 3/2012 | Sivasubramanian | G06F 11/1456 711/162 |
| 2012/0102307 A1 | 4/2012 | Wong | |
| 2012/0204056 A1 | 8/2012 | Airaud et al. | |
| 2012/0275595 A1 | 11/2012 | Emelko | |
| 2013/0145177 A1 | 6/2013 | Cordella et al. | |
| 2013/0262880 A1 | 10/2013 | Pong et al. | |
| 2013/0339730 A1 | 12/2013 | Nagai et al. | |
| 2013/0339744 A1 | 12/2013 | Nagai et al. | |
| 2014/0082721 A1 | 3/2014 | Hershman et al. | |
| 2014/0143883 A1 | 5/2014 | Shen-Orr et al. | |
| 2014/0192974 A1 | 7/2014 | Hamilton et al. | |
| 2014/0281564 A1 | 9/2014 | Nagai et al. | |
| 2015/0074406 A1 | 3/2015 | Nagai et al. | |
| 2015/0089234 A1 | 3/2015 | Kaluzhny et al. | |
| 2016/0098580 A1 | 4/2016 | Kaluzhny et al. | |
| 2016/0139976 A1 | 5/2016 | Tasher et al. | |

FOREIGN PATENT DOCUMENTS

| | | |
|---|---|---|
| EP | 1615370 A1 | 1/2006 |
| EP | 2566096 A2 | 3/2013 |
| TW | 201502854 A | 1/2015 |
| WO | 03053001 A1 | 6/2003 |
| WO | 2013035006 A1 | 3/2013 |

OTHER PUBLICATIONS

TCG PC Client Specific Implementation Specification for Conventional BIOS, Version 1.20 Final Revision 1.00, 1.2; Level 2, 119 pages, Jul. 13, 2005.

TCG PC Client Specific TPM Interface Specification (TIS), Specification Version 1.21 Revision 1.00, 103 pages, Apr. 28, 2011.

TPM Main Part 1 Design Principles, Specification Version 1.2 ,Revision 62, 150 pages, Oct. 2, 2003.

Java Security Architecture, 62 pages, Dec. 6, 1998.

Turley, J., "New MIPS CPUs are Virtually Better: M5100 and M5150 Add Tasty Virtualization to the MIPS Recipe", Electronic Engineering Journal, 2 pages, Apr. 30, 2014.

Lin et al., "Enhance hardware security using FIFO in pipelines", 7th International Conference on Information Assurance and Security, Melacca, Malaysia, pp. 344-349, Dec. 5-8, 2011 (abstract).

U.S. Appl. No. 15/181,427 Office Action dated Jan. 13, 2017.
U.S. Appl. No. 15/181,427 Office Action dated Jun. 21, 2017.
U.S. Appl. No. 14/702,791 Office Action dated Aug. 30, 2017.
U.S. Appl. No. 13/965,256 Office Action dated Jun. 27, 2016.
U.S. Appl. No. 14/702,791 Office Action dated Jun. 16, 2016.

Zhuang, H.,"HIDE: An Infrastructure for Efficiently Protecting Information Leakage on the Address Bus", Proceedings of the 11th international conference on Architectural support for programming languages and operating systems (ASPLOS'04), pp. 72-84, Boston, USA, Oct. 9-13, 2004.

* cited by examiner

PROTECTION FROM SIDE-CHANNEL ATTACKS BY VARYING CLOCK DELAYS

FIELD OF THE INVENTION

Embodiments of the present invention relate generally to the field of data security, and more specifically, to protection from side-channel attacks.

BACKGROUND

In certain side-channel attacks, information relating to the timing and/or power consumption of computations may be used to compromise the security of a secure data system.

US Patent Application Publication 2012/0204056, whose disclosure is incorporated herein by reference, describes a data processing apparatus that is configured to perform a data processing operation on at least one data value in response to a data processing instruction. The data processing apparatus comprises a delay unit situated on a path within the data processing apparatus, wherein the delay unit is configured to apply a delay to propagation of a signal on the path and propagation of that signal forms part of the data processing operation. The data processing apparatus is configured to determine a result of the data processing operation at a predetermined time point, wherein the predetermined time point following an initiation of the data processing operation by a predetermined time interval. The delay unit is configured such that a time for the data processing operation to be performed plus the delay is less than the predetermined time interval.

US Patent Application Publication 2011/0285421, whose disclosure is incorporated herein by reference, describes a technique and method for reducing ability to monitor the relationship between currents in the system and the data in the system by closing the overall clock eye diagram, whilst keeping the eye diagram for connected stages open. The degree of eye closure for connected pipeline stages allows the system to run closer to its maximum operating speed compared to the use of system wide clock jitter, yet the overall closure provides security that is absent from systems with a partially open eye.

U.S. Pat. No. 8,427,194, whose disclosure is incorporated herein by reference, describes a technique and methods for reducing the ability of an intruder to monitor the relationship between currents in the system and the data in the system through the use of a randomized clock wherein the clock eye diagram is closed and without significant reduction in maximum operating speed compared to the reduction in maximum operating frequency that occurs when using conventional means of additive jitter.

SUMMARY OF THE INVENTION

There is provided, in accordance with some embodiments of the present invention, a system that includes a logic circuit, configured to perform a plurality of instances of a particular computation that is based on a plurality of inputs. The system further includes delay circuitry configured to vary a power-consumption profile of the logic circuit over the plurality of instances, by applying, to the inputs, respective delays that vary over the instances, at least some of the delays varying independently from each other.

In some embodiments, each one of the delays varies independently from each other one of the delays.

In some embodiments, each one of the delays varies between two values.

In some embodiments, the delay circuitry is configured to vary the power-consumption profile of the logic circuit over the plurality of instances by causing a variation, over the instances, in intermediate output values that are computed by the logic circuit.

In some embodiments, the delay circuitry is configured to vary the power-consumption profile of the logic circuit over the plurality of instances by causing a variation, over the instances, in respective timings of computations performed by the logic circuit.

In some embodiments, the system further includes a plurality of flip-flops, each one of the inputs being from a respective one of the flip-flops.

In some embodiments, the system further includes a register that includes the flip-flops.

In some embodiments, the delay circuitry includes a plurality of delay circuits, each one of the delay circuits being configured to apply a respective one of the delays to a respective one of the inputs by:

delaying a clock signal by the respective one of the delays, such as to yield a delayed clock signal, and feeding the delayed clock signal to a respective one of the flip-flops.

In some embodiments, each one of the delay circuits is configured to delay the clock signal by a duration that is a function of a respective generated random delay bit.

In some embodiments, the system further includes one or more other logic circuits having respective propagation delays and connected in series with the logic circuit, and the delay circuitry is configured to apply the respective delays to the inputs such that a total propagation delay of the logic circuit does not exceed, in any one of the instances, a maximum one of the respective propagation delays of the other logic circuits.

There is further provided, in accordance with some embodiments of the present invention, a method. The method includes, using a logic circuit, performing a plurality of instances of a particular computation that is based on a plurality of inputs. The method further includes varying a power-consumption profile of the logic circuit over the plurality of instances, by applying, to the inputs, respective delays that vary over the instances, at least some of the delays varying independently from each other.

The present invention will be more fully understood from the following detailed description of embodiments thereof, taken together with the drawings, in which:

DETAILED DESCRIPTION OF EMBODIMENTS

Overview

Figure 1:
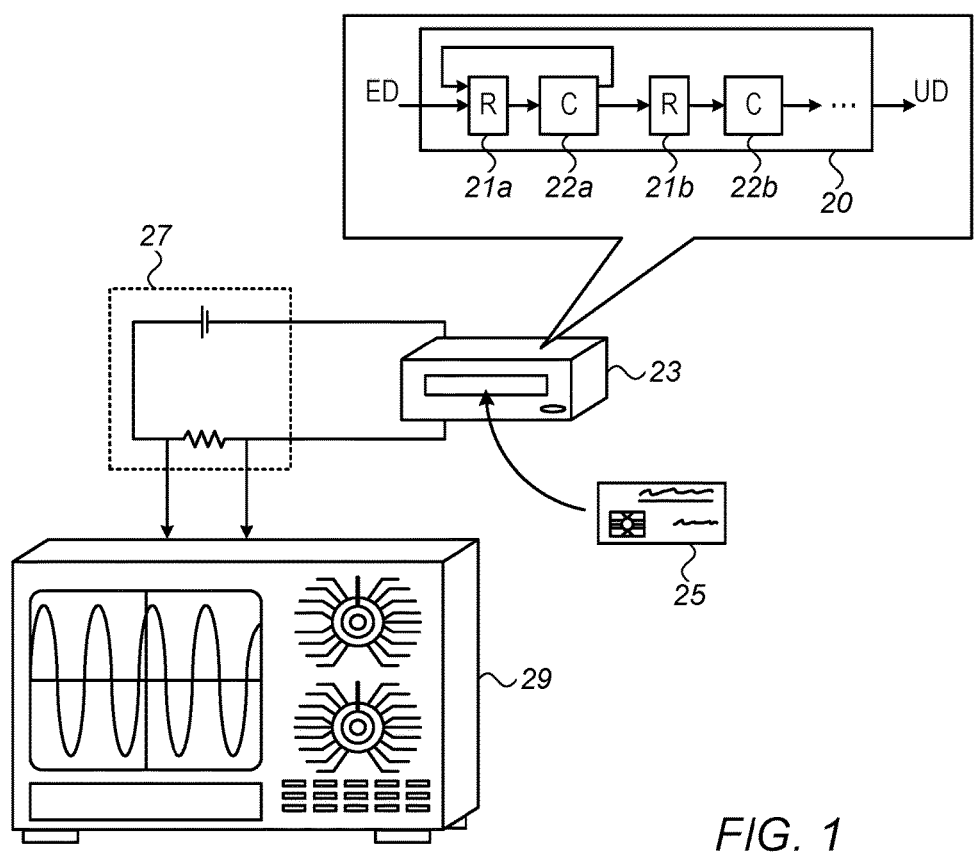
FIG. 1 is a schematic high-level illustration of a system for protecting against side-channel attacks, in accordance with some embodiments of the present invention.

Some side-channel attacks exploit the consistency in the power-consumption profile of a system, to gain unauthorized access to information from within the system. For example, a side-channel attack may be used to break the encryption of a cryptosystem, thus gaining access to information from within the cryptosystem.

Embodiments of the present invention protect against such side-channel attacks, by "randomizing" the power-consumption profile of the system. To achieve this randomization, random delays (i.e., delays whose durations vary randomly are applied to the inputs of at least one logic circuit belonging to the system. Due to these delays, the manner in which the logic circuit performs any particular computation will vary between instances of the computation. For example, the random delays may cause the logic circuit to compute, prior to computing the final output value, intermediate outputs that change, in value and/or timing, as a function of the random delays. Hence, the power-consumption profile of the logic circuit will vary between instances of any particular computation, at least due to (i) the varying intermediate output values computed by the logic circuit, and (ii) the varying timing of the computations performed by the logic circuit.

Alternatively or additionally, random delays may be applied to at least one memory element (such as a register of flip-flops) within the system, thus causing the power-consumption profile of the memory element to vary between instances of any particular computation, by varying the times at which the memory element is updated. In some cases, inputs to a logic circuit are received from a memory element, such that delays applied to the memory element affect the power consumption of both the memory element and the logic circuit.

In the context of the present application, including the claims, a "logic circuit" is any electronic circuit that computes an output by performing a logical operation on input values. (Such a logical operation is typically a combination of the basic NOT, AND, OR, NAND, NOR and XOR operations.) The output of the logic circuit may be a pure function only of the present input to the circuit, in which case the logic circuit is referred to a "combinational-logic circuit" or "combinatorial-logic circuit." Alternatively, the output may depend on the history of the input to the circuit and/or on a previous output, in which case the logic circuit is referred to a "sequential-logic circuit." Embodiments described herein may be applied to both combinational-logic circuits and sequential-logic circuits.

In the context of the present application, including the claims, the "power-consumption profile" of a system or circuit refers to the amount of power consumed by the system or circuit as a function of time. Moreover, references to "varying a power-consumption profile" refer to varying the amount of power consumed by the system or circuit at at least one instant in time, by more than a normal amount of statistical variation. In other words, even though variation in temperature, voltage, and/or other factors may cause a power-consumption profile to exhibit a normal amount of statistical variation, such variation is "canceled out" in a side-channel attack. Embodiments described herein, on the other hand, vary the power-consumption profile by more than this normal amount, thus foiling any potential side-channel attack.

System Description

Reference is initially made to FIG. 1, which is a schematic high-level illustration of a system 20 for protecting against side-channel attacks, in accordance with some embodiments of the present invention. System 20 is shown as a component of a card reader 23, which is used for reading a smart card 25. Notwithstanding this particular embodiment, however, it is noted that system 20 may also be implemented on any other suitable type of apparatus. For example, system 20 may be implemented on smart card 25, or, more generally, on any device that implements digital logic, such as a central processing unit (CPU) in any stationary or mobile computer.

FIG. 1 shows, at a high schematic level, the flow of data into, within, and from system 20. First, encrypted data "ED" from smart card 25 is received by system 20. Such data may, for example, be received by a first register ("R") 21a. Subsequently, the data may flow to a first logic circuit ("C") 22a, which may compute an output from the data. The output may then be fed back to first register 21a, and/or to a second register 21b, from which it may subsequently flow to a second logic circuit 22b. The data may continue to pass through any number of registers and logic circuits, each of the logic circuits performing any relevant operations on the data, in response to any relevant additional inputs. Finally, system 20 outputs unencrypted data "UD," which may be used, for example, to perform a financial transaction.

FIG. 1 also shows an oscilloscope 29, poised to carry out a side-channel attack on card reader 23 by monitoring the power input 27 to the card reader. As further described below, system 20 is configured to foil such an attack, by varying the power-consumption profile of the card reader from one card readout operation to another. (In some cases, an attacker may alternatively or additionally attempt to illicitly extract data by monitoring the power consumption of smart card 25. The implementation of system 20 on the smart card, as described above, may help foil such an attack.)

Figure 2:
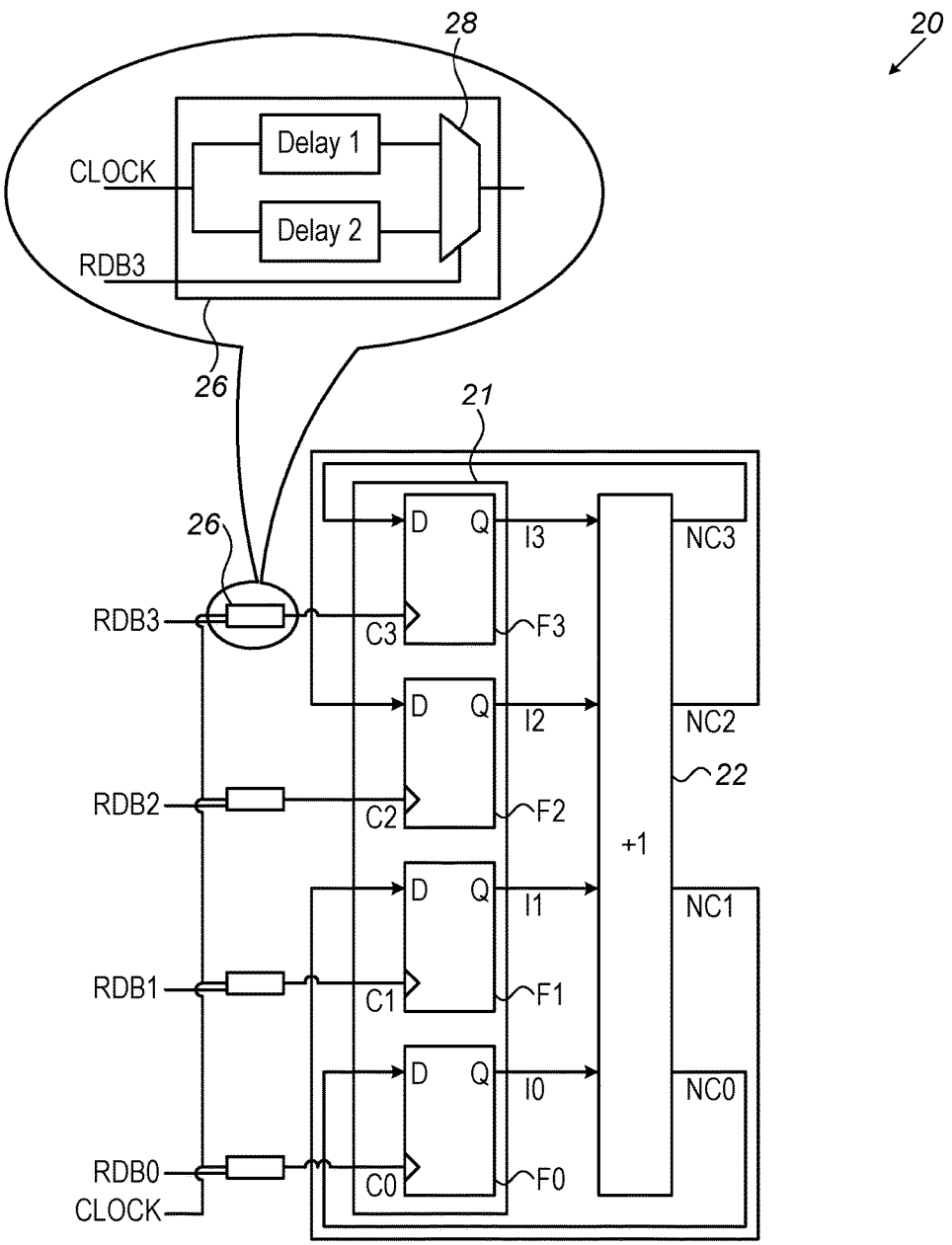
FIG. 2 is a schematic illustration of an example embodiment of the system of FIG. 1, in accordance with some embodiments of the present invention.

Reference is now made to FIG. 2, which is a schematic illustration of an example embodiment of system 20, in accordance with some embodiments of the present invention. For sake of illustration, FIG. 2 shows a simple example, in which the cascade of registers and logic circuits shown in FIG. 1 is replaced with a single register 21 and single logic circuit 22, which, as described below, performs an addition operation on the data from register 21. It is noted, however, that the principles and techniques described with reference to FIG. 2 may be similarly applied to other systems having much higher levels of complexity.

Register 21 comprises a plurality of flip-flops, indicated in FIG. 2 by reference numerals F3, F2, F1, and F0. At any given time, each of the flip-flops stores a single binary value. It is assumed throughout the present description that flip-flop F3 stores the highest-order bit, flip-flop F2 the next-highest-order bit, etc. For example, when (i) F3 and F1 store 0, and (ii) F2 and F0 store 1, register 21 will store the value 0101 (=5). Given that, as further described below, the example embodiment of FIG. 2 implements a counter, the value stored in the register may be referred to as the value of a "COUNT" variable.

FIG. 2 shows F3 receiving a clock signal C3, F2 receiving a clock signal C2, F1 receiving a clock signal C1, and F0 receiving a clock signal C0. Upon the rising (or, alternatively, falling) edge of each respective clock signal, the corresponding flip-flop captures ("latches") the value of a respective data input D. After a short delay, the captured value becomes output Q of the flip-flop, this output being subsequently input to logic circuit 22. Thus, FIG. 2 shows the output from flip-flop F3 being fed to the logic circuit as an input I3, the output from flip-flop F2 being fed to the logic circuit as an input I2, the output from flip-flop F1 being fed to the logic circuit as an input I1, and the output from flip-flop F0 being fed to the logic circuit as an input I0.

Logic circuit 22 performs a logical operation on the inputs. In particular, in FIG. 2, logic circuit 22 is a counter that performs a "+1" operation, in which 1 is added to the input to the logic circuit. This operation yields an output NEXT COUNT (or "NC") that includes four output bits NC3, NC2, NC1, and NC0. In the present description, NC3 is assumed to be the highest-order bit of NEXT COUNT, NC2 the next-highest-order bit, etc. Each output bit is fed to the flip-flop corresponding to the order of magnitude of the output bit, such that, during the next clock cycle, COUNT acquires the value of NEXT COUNT.

Thus, for example, an initial COUNT of 0001 may be input to the logic circuit. (This means that I0=1, while I1=I2=I3=0.) By performing the "+1" operation, the logic circuit computes an output NEXT COUNT of 0010. (This means that NC1=1, while NC0=NC2=NC3=0.) This output is then fed back to the flip-flaps, such that, during the next clock cycle, flip-flop F1 captures the value 1, while the remainder of the flip-flops capture the value 0, i.e., COUNT is incremented to 0010. This new value of COUNT is then input to the logic circuit.

As noted above, many details shown in FIG. 2 are provided by way of illustration only. In practice, embodiments of the present invention may be applied to any suitable number of logic circuits, each of which may perform any suitable operation. Each logic circuit may receive any number of inputs, including, for example, inputs that are received from sources other than memory elements within the system, and may calculate any number of outputs. Such outputs may be fed to memory elements as shown, and/or may be used in any other way. Moreover, system 20 may comprise any suitable number of memory elements of any suitable type.

To protect against side-channel attacks, embodiments of the present invention delay the clock signals to the flip-flops by respective durations that vary between instances of any particular computation. The delays to the clock signals cause a variation in the times at which the flip-flops capture their new respective values, thus varying the power-consumption profile of the flip-flops. Moreover, since the inputs to the logic circuit are received from the flip-flops, the clock-signal delays have the further effect of varying the power-consumption profile of the logic circuit. Thus, the power-consumption profile of the system as a whole is varied, due to variation in both the power-consumption profile of the flip-flops and the power-consumption profile of the logic circuit. (Notwithstanding the above, it is noted that the scope of the present invention includes varying the power-consumption profile of one or more logic circuits, as described herein, without varying the power-consumption profile of any memory elements.)

At least some of the delays vary independently from each other; for example, as shown in FIG. 2 and further described below, each of the delays may vary independently from each of the other delays. In some embodiments, as further described immediately below with reference to FIG. 2, system 20 may randomly delay each clock signal by one of two delay durations. In such a case, assuming four flip-flops as shown, there are $2^4$=16 different power-consumption profiles for each possible calculation that the logic circuit may perform. In more complex systems, having a greater number of flip-flops and/or circuits, there may be millions or billions of power-consumption profiles, such that successfully conducting a side-channel attack becomes virtually impossible. For example, with 32 flip-flops, and assuming only two delay duration the number of different power-consumption profiles is greater than 4 billion.

In some embodiments, delay circuits 26 are used to delay the clock signals received by the flip-flops. For example, as shown in FIG. 2, a common CLOCK signal may be fed to each of a plurality of delay circuits 26. Each delay circuit receives the CLOCK signal, delays the CLOCK signal, and then feeds the delayed signal to a respective one of the flip-flops.

In some embodiments, each delay circuit delays the CLOCK signal in response to a random delay bit "RDB," which is generated independently from the random delay bits fed to the other delay circuits. (In FIG. 2, the random delay bits are indicated by reference numerals RDB3, RDB2, RDB1, and RDB0, corresponding, respectively, to F3, F2, F1, and F0.) In response to the random delay bit, a multiplexer 28 may activate one of two delay elements "Delay 1" and "Delay 2," such that the CLOCK signal is delayed by one of two delay durations. For example, multiplexer 28 may select "Delay 1" in response to RDB=0, and "Delay 2" in response to RDB=1. In this manner, the delay for each flip-flop varies in a random manner.

Notwithstanding the particular embodiment described above, it is noted that the scope of the present invention includes the use of any suitable circuitry to delay the inputs to the logic circuit, and/or delay the times at which memory elements within the system are updated.

Figure 3A:
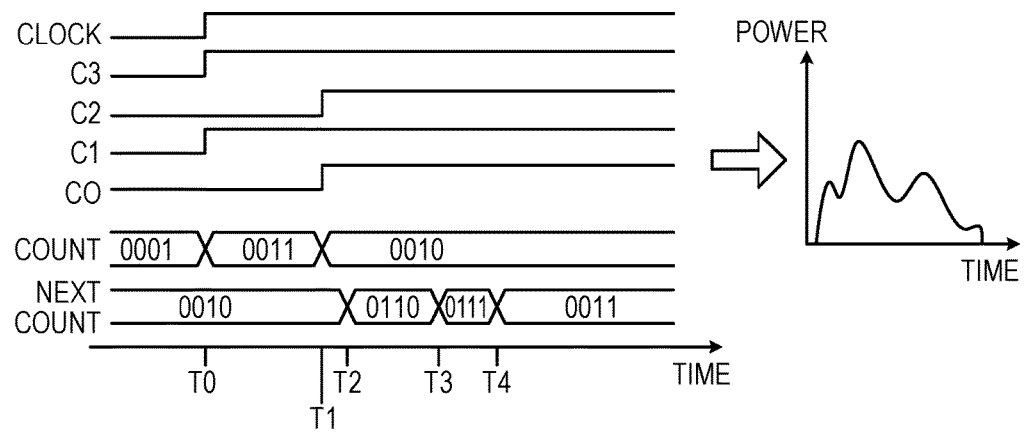
FIGS. 3A-B are schematic illustrations of respective timelines for operation of the system of FIG. 1, in accordance with some embodiments of the present invention.
Figure 3B:
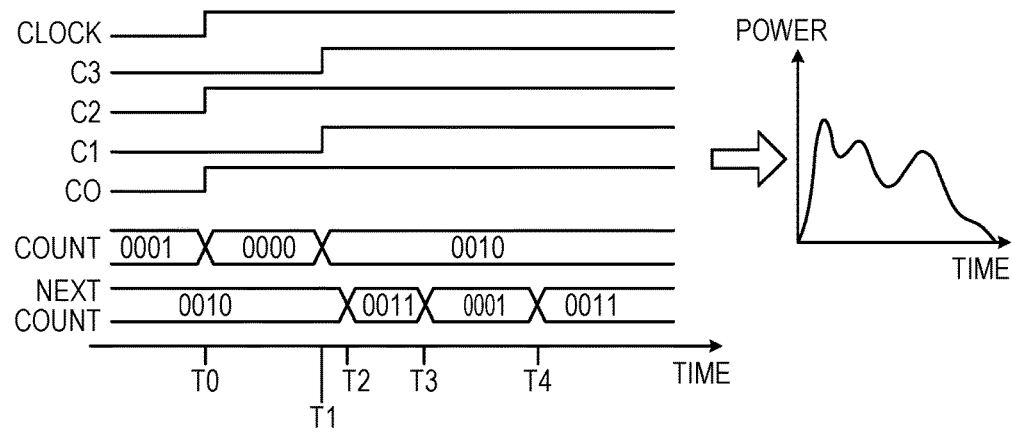

The effect of the random delays applied to the clock signals is demonstrated in FIGS. 3A-B, which are schematic illustrations of respective timelines for operation of system 20, in accordance with some embodiments of the present invention. FIGS. 3A-B are based on the embodiment of system 20 shown in FIG. 2.

A first scenario is shown in FIG. 3A. In this first scenario, the initial value of COUNT stored in the register is 0001, while NEXT COUNT initially has the value 0010 (which, per the "+1" operation, is 1 greater than COUNT). At time T0, CLOCK goes from low to high. Due to the delay circuits, however, the register does not immediately capture the value 0010, but rather, first captures an intermediate value 0011. In particular, (i) the delay circuits for F3 and F1 each delay CLOCK by a duration of zero (e.g., by applying a "Delay 1" of zero), such that clock signals C3 and C1 go from low to high at time T0, but (ii) the delay circuits for F2 and F0 delay CLOCK by a greater duration, such that clock signals C2 and C0 go from low to high only at a later time T1. (For example, these latter delay circuits may apply a "Delay 2" of T1-T0.) Thus, at T0, F3 and F1 capture, respectively, bits NC3 and NC1 from NEXT COUNT, but F2 and F0 retain their previous values, such that COUNT=0011.

Sometime after T0, the logic circuit receives the new input 0011. The logic circuit then begins to operate on 0011. First, at time T2, the logic circuit outputs an intermediate output of 0110. This output is "between" the initial output value of 0010 and the "target" output value of 0100 (which is 1 greater than the input 0011), in that the logic circuit has set NC3 to 1, but has not yet set NC1 to 0.

As noted above, at time T1, prior to T2, F2 and F0 capture, respectively, the values of NC2 and NC0, such that the value stored in the register changes to 0010. Subsequently, sometime after T1, the logic circuit receives the input 0010 from the register, and begins to process the input. First, at time T3, the logic circuit outputs the intermediate value 0111, which is "between" the previous output 0110 and the "target" output 0011, in that the logic circuit has set NC0 to 1, but has not yet set NC3 to 0. Subsequently, at time T4, the logic circuit outputs the final output 0011.

Typically, system 20 is configured such that each of the clock-signal delays is shorter than the time required for the logic circuit to finish its first computation. Thus, for example, in FIG. 3A, the final update to COUNT occurs at T1, before the first change to NEXT COUNT at T2. (If any one of the clock signals were to be delayed beyond T2, the register would capture the incorrect value 0110, instead of 0010.)

A second scenario is shown in FIG. 3B. In this second scenario, the initial states of COUNT and NEXT COUNT are the same as in FIG. 3A, and the logic circuit performs the identical "+1" computation. However, due to the different delays applied to the clock signal inputs to the flip-flops, the manner in which the computation proceeds is markedly different.

First, at T0, F2 and F0 capture their new respective values, such that the register stores the intermediate value 0000. The logic circuit then begins to process this intermediate input. Then, at T1, F3 and F1 capture their new respective values, such that COUNT changes to 0010. The logic circuit, however, continues to operate on the intermediate input value 0000. Thus, at time T2, the logic circuit outputs an intermediate value 0011. (This value is "between" 0010 and the "target" output 0001, in the sense described above; incidentally, this value happens to be the same as the final output.) Then, at time T3, the logic circuit outputs the value 0001, which is the final result of applying the "+1" operation to the intermediate input 0000. Finally, at time T4, the logic circuit outputs 0011, which is the final result of applying the "+1" operation to the final input 0010.

It thus emerges that FIG. 3B differs from FIG. 3A in at least two ways, due to the different intermediate input value (0000 vs. 0011) passed to the logic circuit. First, as noted above, the logic circuit computes different intermediate output values (0011 and 0001 vs. 0110 and 0111). Second, the timing of the computations performed by the logic circuit is different. Thus, for example, FIG. 3B shows the T3 transition in the value of NEXT COUNT occurring earlier, and the final T4 transition occurring later, than in FIG. 3A. Due to these differences, the power-consumption profile of the logic circuit is different for FIG. 3B than for FIG. 3A, as indicated by the different (purely illustrative) power-consumption plots shown in the figures.

In some cases, changing the intermediate input values may further cause the number of intermediate output values to change. The change in the number of intermediate output values is yet another factor that may affect the power-consumption profile.

(It is noted that the intermediate output values shown in the figures were chosen to be "in-between values" for the sake of illustration only. In the context of the present application, including the claims, an "intermediate output value" may be any value that is output by the logic circuit prior to outputting the final result of the computation.)

Typically, as noted above, system 20 comprises a plurality of logic circuits connected in series with each other. For such multi-circuit systems, typically (but not necessarily), clock delays are applied only to the inputs of the faster ones of these circuits, in order to ensure that the overall speed of the system is no less than it would have been without the delays.

For example, if the slowest logic circuit in a CPU has a propagation delay of 9.9 nanoseconds, the duration of the clock cycle of the CPU may be set to 10 nanoseconds. (This corresponds to a clock speed of approximately 100 MHz; 100 million is slightly less than the number of calculations per second that the slowest logic circuit can perform.) Therefore, in order to maintain the duration of the clock cycle at 10 nanoseconds, delays may be applied only to the inputs of those circuits whose total propagation delays (including the clock delays) are less than 10 nanoseconds, with a sufficient margin of safety. For example, the clock delays may be set such that no total propagation delay in the system exceeds the "baseline" propagation delay of 9.9 nanoseconds. Thus, by way of illustration, a circuit having an initial propagation delay of 8 nanoseconds may have one or more inputs delayed by any suitable duration that does not exceed 1.9 nanoseconds. Alternatively or additionally, another circuit having an initial propagation delay of 7 nanoseconds may have one or more inputs delayed by any suitable duration that does not exceed 2.9 nanoseconds.

(In the context of the present application, including the claims, the "propagation delay" of a logic circuit is the time required for the circuit to output the result of a computation, measured from the time of receipt of the input.)

It will be appreciated by persons skilled in the art that the present invention limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a logic circuit, configured to perform a plurality of instances of a particular computation;
a plurality of flip-flops, configured to:
    capture respective bit values, and
    subsequently to capturing the bit values, output the bit values, as inputs for the computation, to the logic circuit; and
delay circuitry configured to vary both a power-consumption profile of the flip-flops and a power-consumption profile of the logic circuit over the plurality of instances, by applying, to respective times at which the bit values are captured by the flip-flops, respective delays that vary over the instances, at least some of the delays varying independently from each other,
wherein the delay circuitry comprises a plurality of delay circuits, each one of the delay circuits being configured to apply a respective one of the delays to a respective one of the times by:
    delaying a clock signal by the respective one of the delays, such as to yield a delayed clock signal, and feeding the delayed clock signal to a respective one of the flip-flops, and
wherein each one of the delay circuits is configured to delay the clock signal by a duration that is a function of a respective generated random delay bit.

2. The system according to claim 1, wherein all of the delays vary independently from each other.

3. The system according to claim 1, wherein each one of the delays varies between two values.

4. The system according to claim 1, wherein the delay circuitry is configured to vary the power-consumption profile of the logic circuit over the plurality of instances by causing a variation, over the instances, in intermediate output values that are computed by the logic circuit.

5. The system according to claim 1, wherein the delay circuitry is configured to vary the power-consumption profile of the logic circuit over the plurality of instances by causing a variation, over the instances, in respective timings of computations performed by the logic circuit.

6. The system according to claim 1, further comprising a register that comprises the flip-flops.

7. The system according to claim 1, further comprising one or more other logic circuits having respective propagation delays and connected in series with the logic circuit, wherein the delay circuitry is configured to apply the respective delays such that a total propagation delay of the logic circuit does not exceed, in any one of the instances, a maximum one of the respective propagation delays of the other logic circuits.

8. The apparatus according to claim 1, wherein the flip-flops are configured to output the bit values directly to the logic circuit.

9. The apparatus according to claim 1, wherein the bit values include output values from a previous computation performed by the logic circuit.

10. A method, comprising:
using a logic circuit, performing a plurality of instances of a particular computation that is based on a plurality of bit values received from a plurality of flip-flops; and
varying both a power-consumption profile of the flip-flops and a power-consumption profile of the logic circuit over the plurality of instances, by applying, to respective times at which the bit values are captured by the flip-flops, respective delays that vary over the instances, at least some of the delays varying independently from each other,
wherein applying the respective delays to the times comprises applying the respective delays to the times by:
feeding a clock signal to a plurality of delay circuits, using the delay circuits, delaying the clock signal, such as to yield a plurality of delayed clock signals, and
feeding, to each of the flip-flops, a respective one of the delayed clock signals, and wherein, for each delay circuit of the delay circuits, delaying the clock signal comprises:
generating a random delay bit, and
using the delay circuit, delaying the clock signal by a duration that is a function of the random delay bit.

11. The method according to claim 10, wherein all of the delays vary independently from each other.

12. The method according to claim 10, wherein each one of the delays varies between two values.

13. The method according to claim 10, wherein the applying of the respective delays varies the power-consumption profile of the logic circuit over the plurality of instances by causing a variation, over the instances, in intermediate output values that are computed by the logic circuit.

14. The method according to claim 10, wherein the applying of the respective delays varies the power-consumption profile of the logic circuit over the plurality of instances by causing a variation, over the instances, in respective timings of computations performed by the logic circuit.

15. The method according to claim 10, wherein the flip-flops belong to a register of flip-flops.

16. The method according to claim 10, wherein the logic circuit is connected in series with one or more other logic circuits having respective propagation delays, and wherein applying the delays comprises applying the delays such that a total propagation delay of the logic circuit does not exceed, in any one of the instances, a maximum one of the respective propagation delays of the other logic circuits.

* * * * *